United States Patent [19]

Nakatsuchi et al.

[11] Patent Number: 5,293,460
[45] Date of Patent: Mar. 8, 1994

[54] VELOCITY-VARIATION MINIMIZATION CONTROL METHOD FOR ROBOT

[75] Inventors: Yoshiaki Nakatsuchi, Kobe; Tatsuo Yano, Ono, both of Japan

[73] Assignee: Kawasaki Jukogyo Kabushiki Kaisha, Hyogo, Japan

[21] Appl. No.: 684,765

[22] Filed: Apr. 15, 1991

[51] Int. Cl.⁵ .............................................. G05B 19/42
[52] U.S. Cl. ....................................... 395/80; 395/87; 364/174
[58] Field of Search ........................ 395/87, 88, 89, 80, 395/95, 97, 86; 364/174

[56] References Cited

U.S. PATENT DOCUMENTS

| | | | |
|---|---|---|---|
| 4,506,335 | 3/1985 | Magnuson | 364/513 |
| 4,623,971 | 11/1986 | Ailman et al. | 364/513 |
| 4,623,971 | 11/1986 | Ailman et al. | 364/513 |
| 4,772,831 | 9/1988 | Casler, Jr. et al. | 378/568 |
| 4,972,131 | 11/1990 | Kojyo et al. | 318/568.1 |
| 5,020,001 | 5/1991 | Yamamoto et al. | 364/513 |

OTHER PUBLICATIONS

Dieter Schmid, Interpolation Bei Numerischen Bahnsteuerungen, Steuerungstechnik, vol. 2, No. 9, Sep. 1969, pp. 342–349.

G. Ledwich, Adaptive Excitation Control, Proceedings of the Institution of Electrical Engineers, vol. 126, No. 3, Mar. 1979, pp. 249–252.

Dixon et al., Introduction to Statistical Analysis, McGraw-Hill, Inc., 1969, 193–197.

Primary Examiner—Michael R. Fleming
Assistant Examiner—Robert W. Downs
Attorney, Agent, or Firm—Oliff & Berridge

[57] ABSTRACT

A velocity-variation minimization control method for a robot includes the steps of substituting a position vector for a start point, a velocity vector for the start point, a position vector for an end point, a velocity vector for the end point, and a provisional movement time into equations that express the position and velocity of the robot as cubic functions with respect to time, to obtain solutions for coefficients of the cubic functions. A sum of squares of differences between a velocity obtained using the coefficients and a target velocity is obtained. Then using convergence calculations are performed to obtain a value of the movement time that minimizes the sum of squares. The robot is then controlled in such a manner that the effector of the robot follows a path based on the converged movement time.

2 Claims, 1 Drawing Sheet

VELOCITY-VARIATION MINIMIZATION CONTROL METHOD FOR ROBOT

BACKGROUND OF THE INVENTION

The present invention relates to a velocity-variation minimization control method for a robot and, in particular, to such a method suitable for application to a robot that performs painting or sealing work.

In general, a robot that performs painting or sealing work is required to move along a complex path both at high speed and smoothly.

Therefore, such movements are realized by minutely specifying details of velocity and path, and such specification is done by teaching the specified velocity and specified path to a robot arm or limb at a fine pitch. In other words, a smooth path is obtained by detailed specifications for each of a large number of short distances or each of a large number of short periods of time.

However, with this method, the algorithms required for teaching by detailed specification are complicated and hence the amount of calculation required increases, the necessary high velocities cannot be obtained, and velocity variations cannot be avoided.

For that reason, smooth path control using high-order functions has been proposed.

For example, Japanese Patent Laid-Open Number 62-72008 (1987) illustrates a fifth-order function method which can obtain a path in which variations with time in acceleration (second-order changes in velocity) are minimized, wherein (1) position at start and end points, (2) velocity vectors at start and end points, (3) acceleration vectors at start and end points, and (4) the time required to move between the two points, act as conditions for obtaining a path between two points.

However, with this method, the user must take into consideration factors such as control based on the robot's abilities when specifying the time taken to move between the two points, which is a scalar quantity, and there is a problem that the path itself and the movement velocity can vary with the specified value of the movement time.

SUMMARY OF THE INVENTION

The object of the present invention is to provide a control method that minimizes variations in velocity of a robot, to enable a minimization of variations in velocity and also to enable a smooth path.

According to the present invention, there is provided a velocity-variation minimization control method for a robot comprising: a step of substituting a position vector for a start point, a velocity vector for said start point, a position vector for an end point, a velocity vector for said end point, and a provisional movement time into equations that express the position and velocity of said robot as cubic functions with respect to time, to obtain solutions for coefficients of said cubic functions; a step of obtaining a sum of squares of differences between a velocity obtained using said coefficients and a target velocity; and a step of using convergence calculations to obtain a value of said movement time that minimizes said sum of squares. The robot is then controlled in such a manner that the of said robot follows a path based on said converged movement time.

According to the present invention, a position vector for a start point, a velocity vector for the start point, a position vector for an end point, a velocity vector for the end point, and a provisional movement time are substituted into equations that express the position and velocity of the robot as cubic functions with respect to time, to obtain solutions for coefficients of the cubic functions. A sum of squares of differences between a target velocity and a velocity obtained using these coefficients is obtained. Next, convergence calculations are performed to obtain a value of the movement time that minimizes the sum of squares. By controlling the robot in such a manner so that the far end of the robot follows a path based on the converged movement time, velocity variations can be minimized and a smooth path can be obtained.

According to the present invention, a path can be obtained that has velocities approaching those of target velocities with minimized velocity variations, by simply substituting start point and end point vectors relating to position and velocity, and a provisional movement time. Therefore, a smooth robot movement can be realized, without the user having to specify a correct movement time.

BRIEF DESCRIPTION OF THE DRAWINGS

In the accompanying drawing.

DESCRIPTION OF THE PREFERRED EMBODIMENTS

Figure 1:
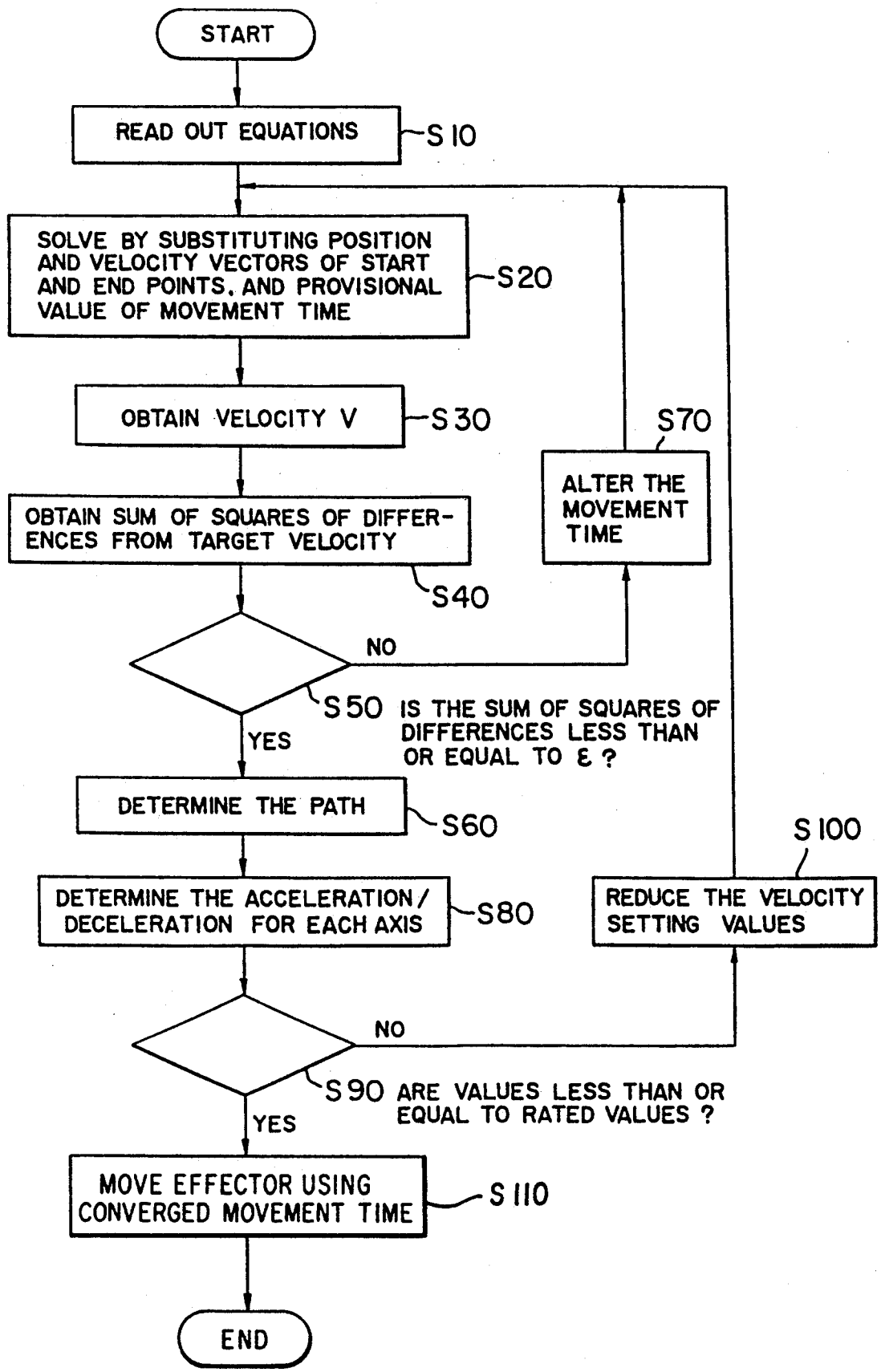
FIG. 1 is a flow chart illustrating the method of the present invention.

The present invention will be described below in detail with reference to an embodiment whose flow chart is shown in FIG. 1. Positions on the path of the effector of the robot can be defined by the following cubic functions:

$$X = a_x t^3 + b_x t^2 + c_x t + d_x \quad (1)$$

$$Y = a_y t^3 + b_y t^2 + c_y t + d_y \quad (2)$$

$$Z = a_z t^3 + b_z t^2 + c_z t + d_z \quad (3)$$

The velocity of the effector of the robot limb can be obtained by differentiating equations (1), (2), and (3) with time, as follows:

$$V_x = dx/dt = 3a_x t^2 + 2b_x t + c_x \quad (4)$$

$$V_y = dy/dt = 3a_y t^2 + 2b_y t + c_y \quad (5)$$

$$V_z = dz/dt = 3a_z t^2 + 2b_z t + c_z \quad (6)$$

Note that each of these equations can be stored beforehand in a memory section of the control device, and can be read out as necessary when velocity control is required (step S10 of FIG. 1).

In this case, the above coefficients $a_x$, $b_x$, $c_x$, $d_x$, $a_y$, $b_y$, $c_y$, $d_y$, $a_z$, $b_z$, $c_z$, and $d_z$ can be obtained by substituting the position vector for the start point, the position vector for the end point, the velocity vector for the start point, the velocity vector for the end point, and a provisional movement time into the equations (step S20).

Therefore, the velocity V of the effector of the robot is obtained in step S30 as follows:

$$V = \sqrt{V_x^2 + V_y^2 + V_z^2}$$

In order to make this velocity approach the target velocity, the calculation in step S40 sums the squares of the difference between this velocity and the target velocity $V_{ref}$ as follows:

$$S = \int (V_{ref} - V)^2 dt$$

A movement time that minimizes the value of S is then obtained by a convergence calculation. In other words, step S50 determines whether the above differences have converged by checking whether or not the result is less than or equal to a minute constant value $\epsilon$, and if it is less than or equal to $\epsilon$, step S60 determines the path between the two points. At that point, velocity variations are at a minimum.

If it is determined in step S50 that the differences have not converged, the movement time is altered in step S70 and the flow returns to step S20.

Note that absolute values of the start and end point velocity vectors are specified by the user, but directions can be automatically determined with respect to the teaching point, so that the user does not need to specify these values.

If it is found as a result of obtaining the accelerations and decelerations required to realize the thus-obtained path (step S80) that these values exceed rated values (step S90), the velocity settings for the start and end points are reduced in step S100, and the flow returns to step S20 until a feasible path can be obtained. If the values obtained for acceleration and deceleration are less than or equal to the rated value, the robot is controlled by moving the effector along the path using the converged movement time (step S110).

The above calculations can be performed by using a high-speed microprocessor or the like.

What is claimed is:

1. A velocity-variation minimization control method for a robot comprising the steps of:

preparing cubic equations expressing positions of an effector of a robot and quadratic equations expressing velocity of said effector, said quadratic equations obtained by differentiating said cubic equations, said cubic and quadratic equations being functions with respect to time;

obtaining solutions for coefficients of said equations by substituting a position vector for an operation start point, a velocity vector for said operation start point, a position vector for an operation end point, a velocity vector for said operation end point, and a provisional movement time for moving from said operation start point to said operation end point into said equations;

obtaining a sum of squares of differences between a velocity obtained using said coefficients and a target velocity;

performing convergence calculations to obtain a value of said movement time that minimizes said sum of squares; and controlling said robot by moving said effector along a path using converged movement time.

2. A velocity-variation minimization control method for a robot according to claim 1, further comprising the steps of:

after performing said convergence calculations, obtaining acceleration and deceleration values for each axis of said robot in such a manner that the path is realized;

comparing the obtained acceleration and deceleration values with rated values;

when said acceleration and deceleration values exceed said rated values, reducing velocity setting values; and returning to said step of obtaining solutions for coefficients using said reduced velocity setting values.

* * * * *